United States Patent
Sun et al.

(10) Patent No.: US 12,090,661 B2
(45) Date of Patent: Sep. 17, 2024

(54) VELOCITY CONTROL-BASED ROBOTIC SYSTEM

(71) Applicant: Dexterity, Inc., Redwood City, CA (US)

(72) Inventors: Zhouwen Sun, Redwood City, CA (US); Samir Menon, Palo Alto, CA (US); Kevin Jose Chavez, Redwood City, CA (US); Toby Leonard Baker, Redwood City, CA (US); David Leo Tondreau, III, San Francisco, CA (US); Andrew Nguyen, San Francisco, CA (US); Cuthbert Sun, San Francisco, CA (US)

(73) Assignee: Dexterity, Inc., Redwood City, CA (US)

( * ) Notice: Subject to any disclaimer, the term of this patent is extended or adjusted under 35 U.S.C. 154(b) by 231 days.

(21) Appl. No.: 17/482,162

(22) Filed: Sep. 22, 2021

(65) Prior Publication Data
US 2022/0088778 A1    Mar. 24, 2022

Related U.S. Application Data

(60) Provisional application No. 63/082,346, filed on Sep. 23, 2020.

(51) Int. Cl.
*B25J 13/08*    (2006.01)
*B25J 9/00*    (2006.01)
(Continued)

(52) U.S. Cl.
CPC ........... *B25J 9/1651* (2013.01); *B25J 9/1612* (2013.01); *B25J 9/1633* (2013.01); *B25J 9/1653* (2013.01); *B25J 9/1664* (2013.01); *B25J 9/1671* (2013.01); *B25J 9/1682* (2013.01); *B25J 9/1697* (2013.01); *B25J 13/088* (2013.01); *B65G 47/917* (2013.01)

(58) Field of Classification Search
CPC ...... B25J 9/1651; B25J 9/1612; B25J 9/1633; B25J 9/1653; B25J 9/1664; B25J 9/1671; B25J 9/1682; B25J 9/1697; B25J 13/088; B25J 9/0093; B65G 47/917; B65G 61/00;
(Continued)

(56) References Cited

U.S. PATENT DOCUMENTS

| | | |
|---|---|---|
| 2010/0094459 A1 | 4/2010 | Cho |
| 2010/0168950 A1* | 7/2010 | Nagano ................. B25J 9/1666 701/25 |

(Continued)

FOREIGN PATENT DOCUMENTS

| | | | |
|---|---|---|---|
| DE | 112016007254 T5 * | 7/2019 | ............. B25J 13/00 |
| JP | H05329789 | 12/1993 | |

(Continued)

*Primary Examiner* — Adam R Mott
*Assistant Examiner* — Heather J Keniry
(74) *Attorney, Agent, or Firm* — Van Pelt, Yi & James LLP

(57) ABSTRACT

A velocity control-based robotic system is disclosed. In various embodiments, sensor data is received from one or more sensors deployed in a physical space in which a robot is located. A processor is used to determine based at least in part on the sensor data an at least partly velocity-based trajectory along which to move an element comprising the robot. A command to implement the velocity-based trajectory is sent to the robot.

19 Claims, 11 Drawing Sheets

(51) Int. Cl.
*B25J 9/16* (2006.01)
*B65G 47/91* (2006.01)
*B65G 61/00* (2006.01)
*G05B 19/418* (2006.01)

(58) Field of Classification Search
CPC ........... G05B 2219/39106; G05B 2219/40195; G05B 2219/40607; G05B 19/4182
See application file for complete search history.

(56) References Cited

U.S. PATENT DOCUMENTS

| | | | |
|---|---|---|---|
| 2012/0296471 A1 | 11/2012 | Kiyonori | |
| 2013/0050121 A1* | 2/2013 | Bruemmer | B25J 9/1694 345/173 |
| 2015/0168939 A1* | 6/2015 | Masoud | G05D 1/0223 901/1 |
| 2017/0036349 A1* | 2/2017 | Dubrovsky | G05D 1/027 |
| 2017/0106738 A1* | 4/2017 | Gillett | B62K 11/007 |
| 2018/0348726 A1* | 12/2018 | West | G05B 19/0428 |
| 2019/0344443 A1 | 11/2019 | Hazan | |
| 2020/0215688 A1 | 7/2020 | Pivac | |
| 2020/0270071 A1 | 8/2020 | Chavez | |
| 2021/0069901 A1* | 3/2021 | Oda | G05D 1/0217 |
| 2021/0094187 A1* | 4/2021 | Kanemoto | B65G 61/00 |

FOREIGN PATENT DOCUMENTS

| | | |
|---|---|---|
| JP | 2007260838 | 10/2007 |
| JP | 2010155328 | 7/2010 |
| JP | 2017039170 | 2/2017 |
| JP | 2019025618 | 2/2019 |
| JP | 2020069640 | 5/2020 |
| TW | I794989 | 3/2023 |
| WO | 2018055745 | 3/2018 |
| WO | WO-2019148441 A1 * | 8/2019 ............ B25J 9/0093 |

* cited by examiner

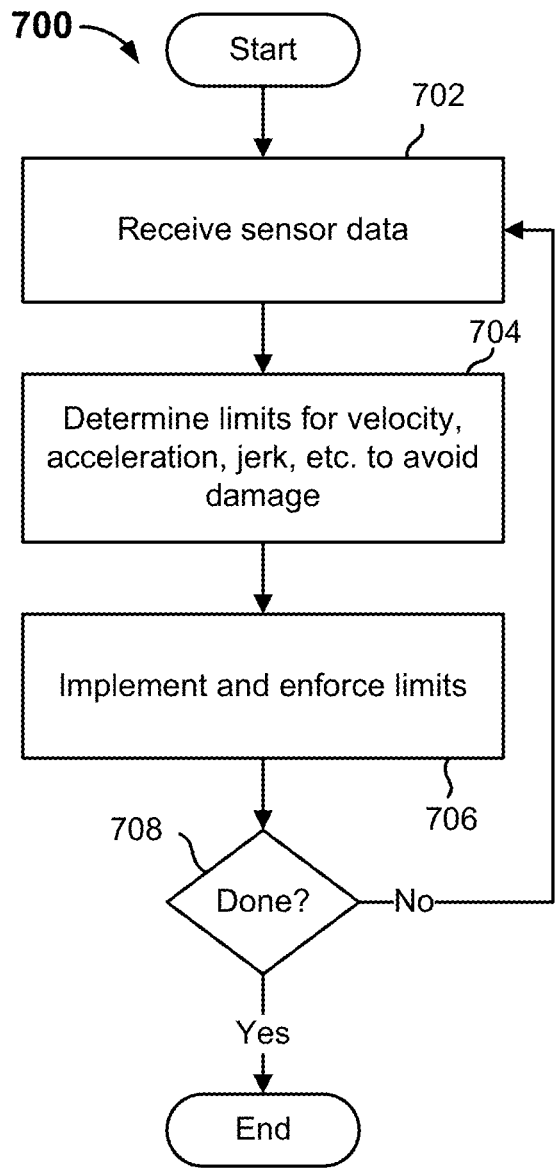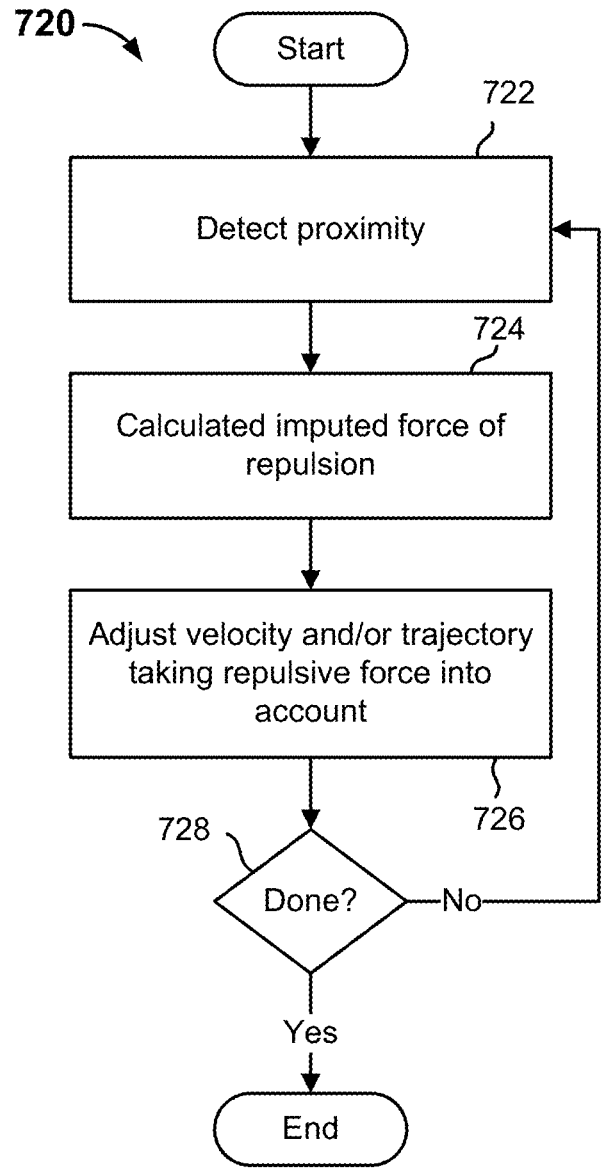
FIG. 7A
FIG. 7B

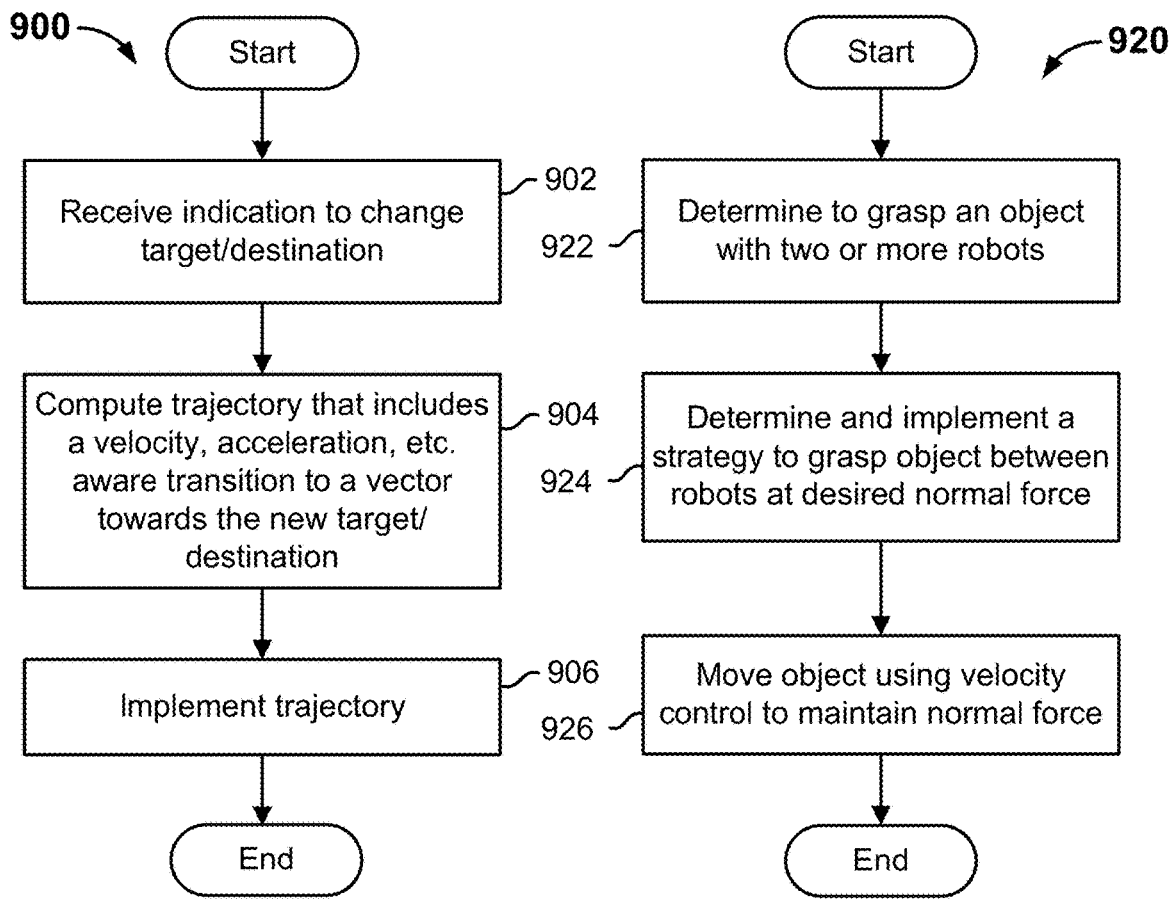
FIG. 9A  FIG. 9B
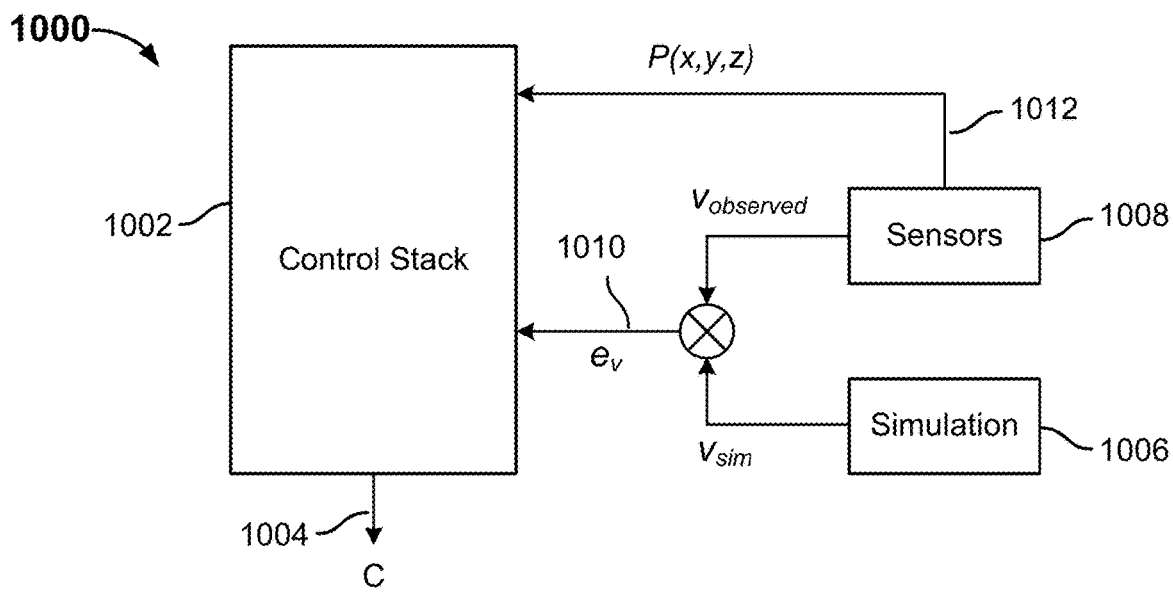
FIG. 10

VELOCITY CONTROL-BASED ROBOTIC SYSTEM

CROSS REFERENCE TO OTHER APPLICATIONS

This application claims priority to U.S. Provisional Patent Application No. 63/082,346 entitled VELOCITY CONTROL-BASED ROBOTIC SYSTEM filed Sep. 23, 2020, which is incorporated herein by reference for all purposes.

BACKGROUND OF THE INVENTION

Typically, robotic arms and other robotic elements are controlled using position control. A control computer determines a target or destination position, e.g., in three-dimensional space, to which the end effector of a robotic arm or other robotic element (sometimes referred to as the "robot") is desired to be moved from a current/start position. The computer and/or software comprising the robot determines how to rotate one or more joints comprising the robot (e.g., joints connecting arm segments and/or mounting a base segment to a base) to cause the end effector to be repositioned.

Typically, the robot applies higher torque to the motor driving the joint the further away the joint is from the ending position to which it is being driven. As a result, the robot tends to move more quickly between points that are further away, and to accelerate more quickly at the start and end of a trajectory, the longer the trajectory is. In the typical approach, the robotic control computer or other control system does not have the ability to directly control velocity and/or acceleration. Movement and higher velocity and/or quicker acceleration could in some contexts result in damage to an item that has been grasped using the robot, e.g., to be placed at a destination location.

Existing techniques to have more granular, if indirect, control over velocity, acceleration, and other higher order derivatives of position in a position-controlled robot include breaking a trajectory down into a series of smaller trajectories. However, such an approach increases complexity and decreases throughput, as compared to a more continuous, single/longer trajectory approach.

Further, it is difficult to use a position-controlled robot to apply a desired amount (or not to exceed a desired maximum or limit) of force to an object that is not in motion, such as to press down on an object sitting on a table. One approach may be to assign a destination position along an axis on which the force is desired to be applied that is in a position to which it is known the object cannot be moved, such as in or under a table or other surface, resulting in the robot applying force in proportion to the distance between the current location and the supposed destination. However, it is difficult to control force using such a technique, and errors may be encountered due to inaccurate information about the current position of the robot's end effector and/or the object.

BRIEF DESCRIPTION OF THE DRAWINGS

Various embodiments of the invention are disclosed in the following detailed description and the accompanying drawings.

FIG. 7A is a flow diagram illustrating an embodiment of a process to determine and impose limits to control a robotic system.

FIG. 7B is a flow diagram illustrating an embodiment of a process to use an imputed force field to control a robotic system.

FIG. 9A is a flow diagram illustrating an embodiment of a process to use velocity control to divert to a new target and/or destination.

FIG. 9B is a flow diagram illustrating an embodiment of a process to use velocity control to use two or more robots cooperatively to perform a task.

FIG. 10 is a block diagram illustrating an embodiment of a velocity control-based robotic system.

DETAILED DESCRIPTION

Figure 1A:
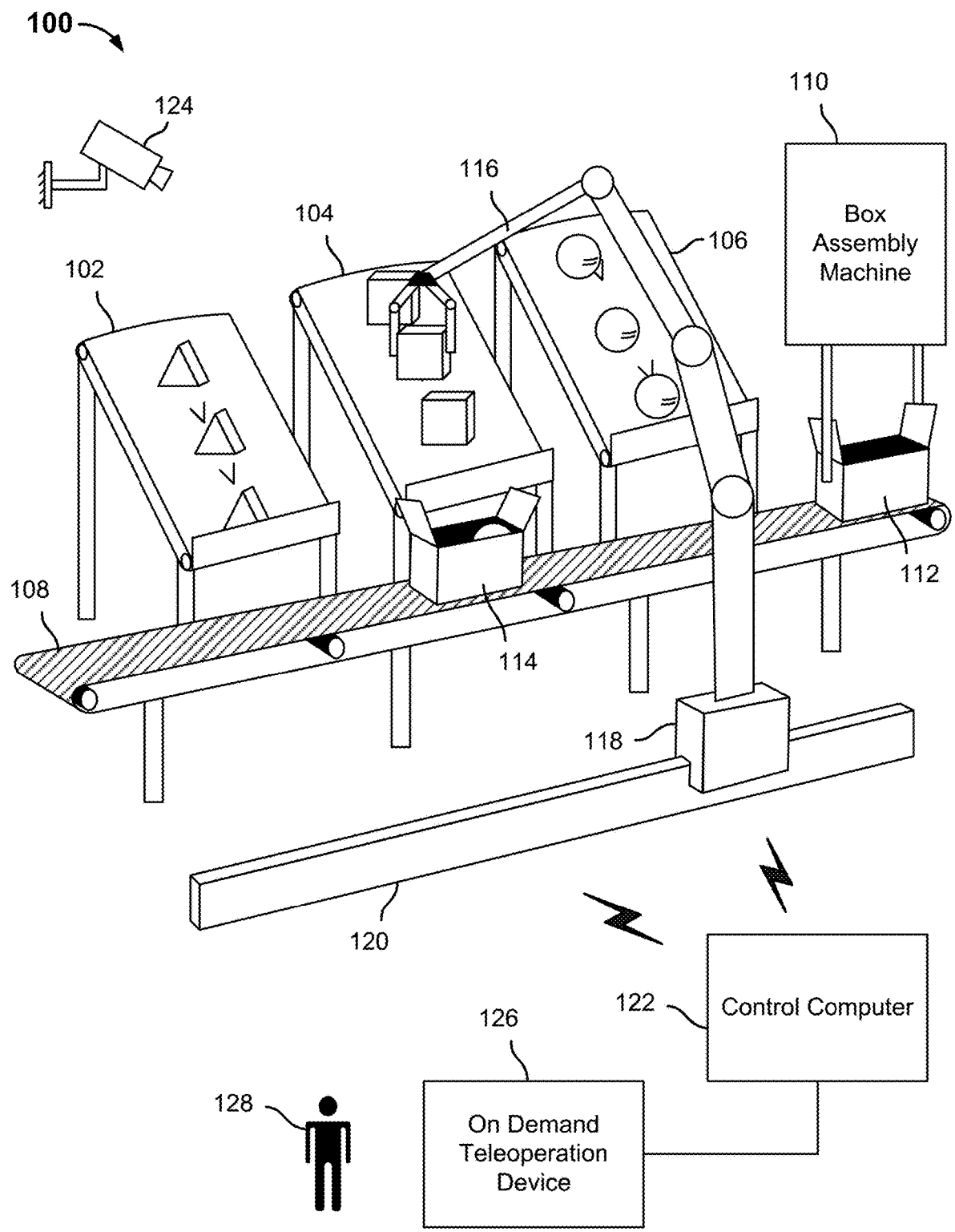
FIG. 1A is a diagram illustrating an embodiment of a robotic kitting system using velocity control.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic system that uses velocity control to operate a robotic arm or other robot is disclosed. In various embodiments, a robotic control system as disclosed herein controls a robot by determining and issuing commands to control the velocity with which the robot moves. In some embodiments, a system as disclosed herein includes a robotic arm or other robot that allows the control system to control more directly the velocity and/or acceleration with which the robot moves, such as by controlling the velocity with which the six (or more or fewer) joints comprising a robotic arm are operated. In some cases, a robot may be controlled via end effector velocity, or other forms of velocity control. Whether controlling the velocity of joints, the end effector, or other mechanisms of the robot, the result is the same and the claims in this document apply the same way, as just a simple translation layer is required. The robot responds to velocity control commands to apply torque at the respective joints at levels associated with the respective velocity control commands received from the robotic control system. For example, the robot may compute a difference/error between a commanded velocity, e.g., for a specific joint, and the current velocity, and may apply a torque computed to reduce or eliminated the difference/error. In some embodiments, the control system generates and issues commands that control more directly the torque (or current, e.g., in amps) applied at the respective joints of the robot. As used herein, the term "torque" may be considered to be interchangeable with "current, e.g., in amps" and references to "torque" mean "torque or current (e.g., in amps)".

In various embodiments, a robotic control system as disclosed herein uses a model of the robot—e.g., representing the robot's elements (e.g., arm segments), geometry, capabilities, etc.—to determine velocity or other control commands to control operation of the robot. For example, the model is used in various embodiments to determine for each joint a velocity, torque, or other command or set of commands to be provided to the robot to achieve a desired velocity, acceleration, etc. of the end effector.

In various embodiments, the robotic control system simulates operation of the robot in a workspace/environment in which the robot is operating (or will operate). The system uses the simulation and (actual and/or simulated) sensor readings from the workspace, such as images or other information, to determine one or more of a current position, a future position, a current velocity, a projected velocity, etc. of the end effector and/or an item, source location, and/or destination location in a dynamic workspace, such of an item to be grasped from a flow of items or a location on moving conveyor at which an item in the robots grasp is to be placed or from which an item is to be grasped. Velocity control is used to move an end effector of the robot to a source/destination location, which in some embodiments may be moving. Velocity control may be used to determine a vector to intercept a moving item or location and updated continuously to drive the end effector to the item/location and/or match the velocity of the item/location, such as to grasp an item in motion and/or place a grasped item on a moving destination location. In some embodiments, an error (difference) between a desired or expected velocity of the robot (e.g., end effector) according to the simulation and a measured or observed velocity determined based on sensor data is used to quickly determine and issue in real time commands to adjust the velocity of the robot to match the simulation.

FIG. 1A is a diagram illustrating an embodiment of a robotic kitting system using velocity control. In the example shown, kitting system 100 includes a set of kitting machines 102, 104, and 106 arranged in a line alongside a box conveyor 108. A box assembly machine 110 assembles boxes 112, 114 and places them on conveyor 108. In various embodiments, box assembly machine 110 may be controlled by and/or in communication with other elements of the kitting system 100, e.g., to coordinate/synchronize box size selection and the timing of the assembly and placement of boxes, e.g., boxes 112, 114, on conveyor 108.

In the example shown in FIG. 1A, robotic arm 116 is mounted on carriage 118, which is configured to ride along a rail or other linear guide 120 disposed alongside and substantially parallel to the conveyor 108, on a side opposite the kitting machines 102, 104, and 106. In various embodiments, a motor, belt, chain, or other source of motive force is applied via a controller (not shown in FIG. 1) to move the carriage 118 and attached robotic arm 116 along the rail or guide 120 to facilitate the automated retrieval of items from the kitting machines 102, 104, and 106 and the placement of items in boxes 112, 114 as they are moved along conveyor 108.

In the example shown, operation of one or more of the kitting machines 102, 104, and 106; conveyor 108; box assembly machine 110; and robotic arm 116 and/or carriage 118 are operated in a coordinated manner under the control of control computer 122. In the example shown, control computer 122 is in wireless communication with controllers, not shown in FIG. 1, each configured to control operation of a corresponding element comprising system 100, e.g., kitting machines 102, 104, and 106; conveyor 108; box assembly machine 110; and robotic arm 116 and/or carriage 118. While wireless connections are shown in FIG. 1, in various embodiments wired connections or a combination of wired and wireless connections may be used.

In various embodiments, control computer 122 is configured, e.g., by software running on control computer 122, to receive data associated with an invoice, order, part list, pick list, or other list of items to be retrieved and packed together; determine a strategy/plan to fulfill the retrieve and pack the required items; and operate elements of system 100, e.g., kitting machines 102, 104, and 106; conveyor 108; box assembly machine 110; and robotic arm 116 and/or carriage 118, in coordination to fulfill the requirement(s).

For example, in some embodiments, control computer 122 is configured to receive a list of items to be packed. Control computer 122 determines which items are associated with which of the kitting machines 102, 104, and 106 and makes a plan to retrieve and pack the items. Control computer 122 controls box assembly machine 110 to assemble a box (e.g., 112, 114) and deposit it on conveyor 108 and controls the conveyor 108 to advance the box to a position to be loaded with one or more items. The control computer 122 controls the carriage 118 and/or robotic arm 116 as needed to position the robotic arm 116 to retrieve the first one or more items from the associated one(s) of the kitting machines 102, 104, and 106. Control computer 122 may control the kitting machines 102, 104, and 106, e.g., to ensure the require item(s) in the required quantities are present in the pickup zone at the end of kitting machines 102, 104, and 106 nearest to the conveyor 108 and robotic arm 116. Control computer 122 controls robotic arm 116 to retrieve the item(s) from the corresponding pickup zone(s) and places them in the box (e.g., 112, 114) before moving on to perform coordinated retrieval and packing of any further items required to be included in that particular kit. Once all items have been retrieved and packed, control computer 122 controls conveyor 108 to advance the box (e.g., 112, 114) to a next stage of fulfillment, not shown in FIG. 1, e.g., a station at which the box is sealed, labeled, and sent to be shipped.

Referring further to FIG. 1A, in the example shown system 100 includes a video camera 124 configured to capture video images of the elements comprising system 100. Camera 124 may be one of a plurality of sensors used by control computer 122 to control the elements comprising system 100. For example, in the example shown, video generated by camera 124 and sent to control computer 122 may be used by control computer 122 to control the speed and/or direction of the conveyor belts comprising the kitting machines 102, 104, and 106 to ensure a sufficient and not excessive number of items are available in the pickup zone and/or to position or reposition the items for retrieval by robotic arm 116. In addition, camera 124 and/or other cameras may be used to facilitate robotic arm 116 picking up an item and/or placing the item in its box (e.g., 112, 114). In various embodiments, a plurality of cameras may be deployed in a number of locations, including in the environment and on the respective elements comprising system 100, to facilitate automated (and, if needed, human assisted) kitting operations. In various embodiments, sensors other than cameras may be deployed, including without limitation contact or limit switches, pressure sensors, weight sensors, and the like.

In various embodiments, control computer 122 is programmed to determine a plan to fulfill a kitting requirement based at least in part on a model of the robotic arm 116 and other elements comprising the system 100, e.g., kitting machines 102, 104, and 106; conveyor 108; box assembly machine 110; and robotic arm 116 and/or carriage 118. The respective models in various embodiments reflect capabilities and limitations of each respective element. For example, the kitting machines 102, 104, and 106 are in fixed positions in this example, but each has a conveyor belt which may be capable of being moved in forward and back directions and/or at different speeds. In addition, the control computer 122 may use information stored in connection with initialization and/or configuration, e.g., which items are on which location(s) on which kitting machine(s), where each kitting machine and/or its associated pick up zone is located, etc., to determine a plan to fulfill a requirement. In addition, control computer 122 may use data determine based at least in part on sensor data, such as video captured by camera 124, to make a plan to fulfill a requirement.

In various embodiments, control computer 122 is configured to formulate and/or update or reformulate a plan to fulfill a requirement, and to implement or attempt to implement the plan, by employing strategies to do a (next) task or subtask that have been programmed into and/or learned by control computer 122. Examples include, without limitation, strategies to use robotic arm 116 to pick up a given item based on attributes of the item (rigidity, fragility, shape, orientation, etc.). In some embodiments, control computer 122 is programmed to use a first (e.g., preferred or best) strategy to attempt to perform a task (e.g., pick up an item with robotic arm 116), and if that fails then to determine and use an alternate strategy, if one is available (e.g., use the robotic arm 116 to nudge the item then try again, operate the conveyor or other instrumentality of the kitting machine, e.g., 102, 104, and 106, forward and/or backward a bit and try again, etc.).

In the example shown in FIG. 1, control computer 122 is connected to an on demand teleoperation device 126 operated by a human operator 128. While in FIG. 1 teleoperation device 126 is operated by a human operator 128, in some embodiments teleoperation device 126 may be operated by a non-human operator, such as a highly skilled robot. In various embodiments, control computer 122 is configured to invoke on demand teleoperation based at least in part on a determination by control computer 122 that it does not have an available strategy to continue/complete a kitting operation and/or a component task thereof through fully automated operation. For example, an item is dropped in a location from which the robotic arm 116 cannot retrieve it; or, an item has been attempted to be picked up a prescribed maximum number of attempts and has not successfully been retrieved; etc. Based on such a determination, control computer 122 sends an alert or other communication to on demand teleoperation device 126, prompting human operator 128 to use teleoperation device 126 to operate one or more elements of system 100—e.g., one or more of kitting machines 102, 104, and 106; conveyor 108; box assembly machine 110; and robotic arm 116 and/or carriage 118—to perform at least the task or subtask the system 100 was not able to complete under fully automated control by control computer 122.

In various embodiments, control computer 122 controls robotic arm 116 and/or carriage 118 using velocity-based control as disclosed herein and described more fully below.

Figure 1B:
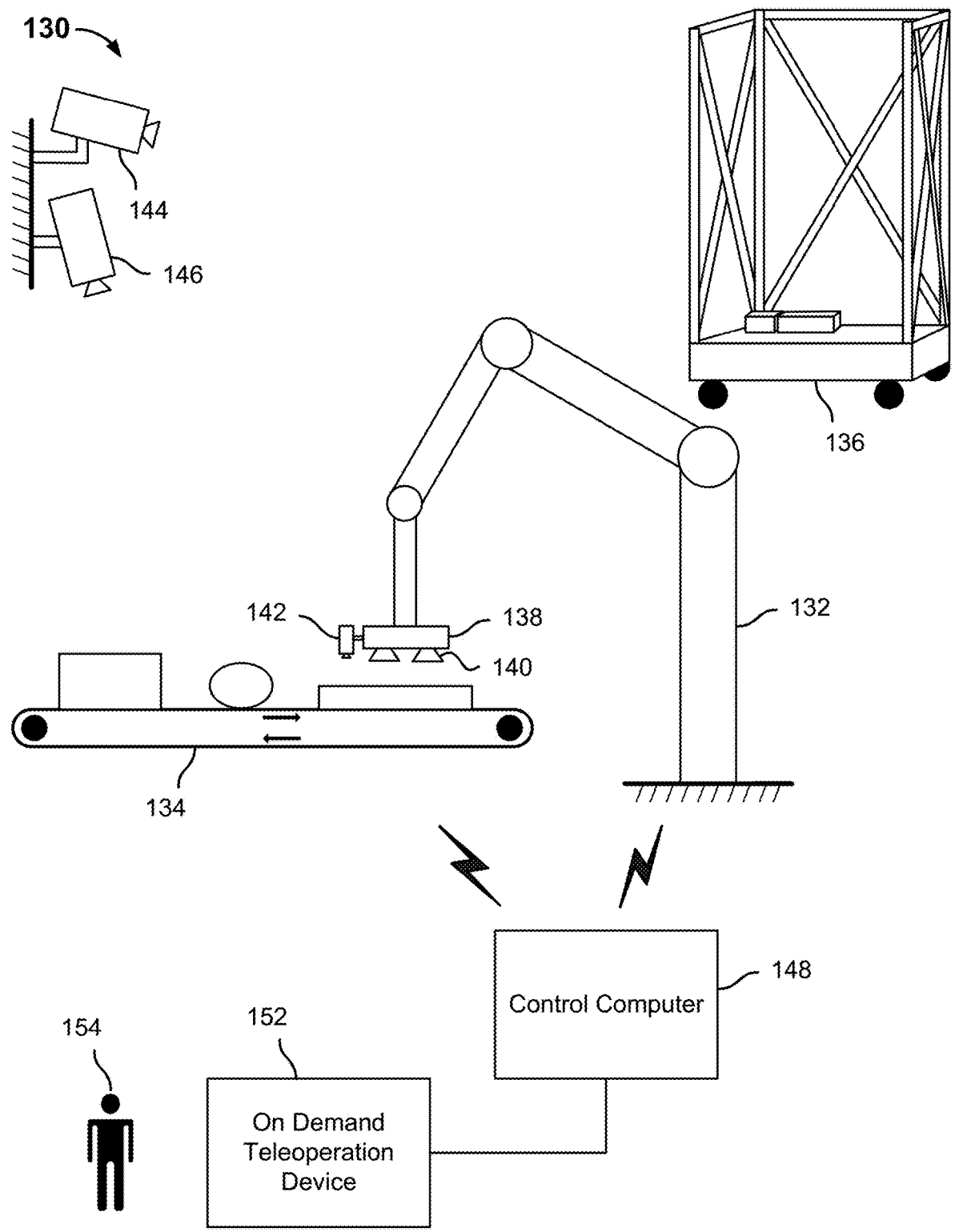
FIG. 1B is a diagram illustrating an embodiment of a robotic system to palletize and/or depalletize heterogeneous items using velocity-based control.

FIG. 1B is a diagram illustrating an embodiment of a robotic system to palletize and/or depalletize heterogeneous items using velocity-based control. In the example shown, system 130 includes a robotic arm 132. In this example the robotic arm 132 is stationary, but in various alternative embodiments robotic arm 132 may be a fully or partly mobile, e.g., mounted on a rail, fully mobile on a motorized chassis, etc. As shown, robotic arm 132 is used to pick arbitrary and/or dissimilar items from a conveyor belt (or other source) 134 and stack them on a pallet or other receptacle 136.

In the example shown, robotic arm 132 is equipped with a suction-type end effector 138. End effector 138 has a plurality of suction cups 140. Robotic arm 132 is used to position the suction cups 140 of end effector 138 over an item to be picked up, as shown, and a vacuum source provides suction to grasp the item, lift it from conveyor 134, and place it at a destination location on receptacle 136.

In various embodiments, one or more of 3D or other camera 142 mounted on end effector 138 and cameras 144, 146 mounted in a space in which robotic system 130 is deployed are used to generate image data used to identify items on conveyor 134 and/or determine a plan to grasp, pick/place, and stack the items on receptacle 136. In various embodiments, additional sensors not shown, e.g., weight or force sensors embodied in and/or adjacent to conveyor 134 and/or robotic arm 132, force sensors in the x-y plane and/or z-direction (vertical direction) of suction cups 140, etc. may be used to identify, determine attributes of, grasp, pick up, move through a determined trajectory, and/or place in a destination location on or in receptacle 136 items on conveyor 134 and/or other sources and/or staging areas in which items may be located and/or relocated, e.g., by system 130.

Referring further to FIG. 1B, in the example shown system 130 includes a control computer 148 configured to communicate, in this example via wireless communication (but in one or both of wired and wireless communication in various embodiments) with elements such as robotic arm 132, conveyor 134, effector 138, and sensors, such as camera 142, 144, and 146 and/or weight, force, and/or other sensors not shown in FIG. 1B. In various embodiments, control computer 148 is configured to use input from sensors, such as camera 142, 144, and 146 and/or weight, force, and/or other sensors not shown in FIG. 1B, to view, identify, and determine one or more attributes of items to be loaded into and/or unloaded from receptacle 136. In various embodiments, control computer 148 uses item model data in a library stored on and/or accessible to control computer 148 to identify an item and/or its attributes, e.g., based on image and/or other sensor data. Control computer 148 uses a model corresponding to an item to determine and implement a plan to stack the item, along with other items, in/on a destination, such as receptacle 136. In various embodiments, the item attributes and/or model are used to determine a strategy to grasp, move, and place an item in a destination location, e.g., a determined location at which the item is determined to be placed as part of a planning/replanning process to stack items in/on the receptacle 136.

In the example shown, control computer 148 is connected to an "on demand" teleoperation device 152. In some embodiments, if control computer 148 cannot proceed in a fully automated mode, for example, a strategy to grasp, move, and place an item cannot be determined and/or fails in a manner such that control computer 148 does not have a strategy to complete picking and placing the item in a fully automated mode, then control computer 148 prompts a human user 154 to intervene, e.g., by using teleoperation device 152 to operate the robotic arm 132 and/or end effector 138 to grasp, move, and place the item.

In various embodiments, control computer 148 controls robotic arm 132 using velocity-based control as disclosed herein and described more fully below.

Figure 2:
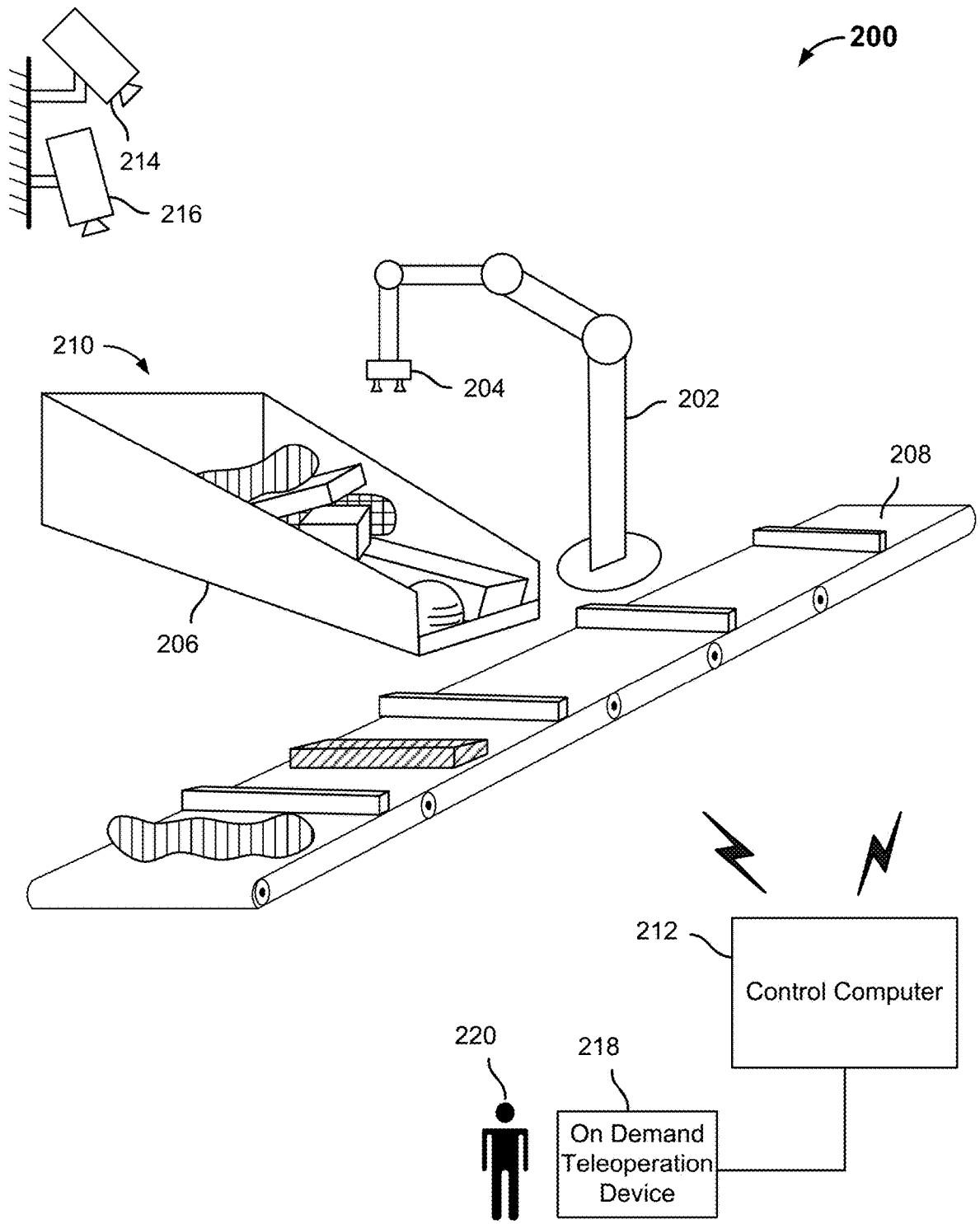
FIG. 2 is a diagram illustrating an embodiment of a robotic singulation system using velocity control.

FIG. 2 is a diagram illustrating an embodiment of a robotic singulation system using velocity control. In various embodiments, a robotic system as disclosed herein may include one or more robotic arms to perform singulation/induction, e.g., retrieving items from a chute or other source of supply or intake and place them singly each on a corresponding location on a conveyor or other output or destination structure.

In the example shown in FIG. 2, system 200 includes a robotic arm 202 equipped with a suction-based end effector 204. While in the example shown the end effector 204 is a suction-based end effector, in various embodiments one or more other types of end effector may be used in a singulation system as disclosed herein, including without limitation a pinch-based end effector or other types of actuated grippers. In various embodiments, the end effector may be actuated by one or more of suction, air pressure, pneumatics, hydraulics, or other actuation. The robotic arm 202 and 204 are configured to be used to retrieve parcels or other items that arrive via chute or bin 206 and place each item in a corresponding location on segmented conveyor 208. In this example, items are fed into chute 206 from an intake end 210. For example, one or more human and/or robotic workers may feed items into intake end 210 of chute 206, either directly or via a conveyor or other electro-mechanical structure configured to feed items into chute 206.

In the example shown, one or more of robotic arm 202, end effector 204, and conveyor 208 are operated in coordination by control computer 212. In various embodiments, control computer 212 includes a vision system used to discern individual items and each item's orientation based on image data provided by image sensors, including in this example 3D cameras 214 and 216. The vision system produces output used by the robotic system to determine strategies to grasp the individual items and place each in a corresponding available defined location for machine identification and sorting, such as a partitioned section of segmented conveyor 208.

Referring further to FIG. 2, in the example shown system 200 further includes an on demand teleoperation device 218 usable by a human worker 220 to operate one or more of robotic arm 202, end effector 204, and conveyor 208 by teleoperation. In some embodiments, control computer 212 is configured to attempt to grasp and place items in a fully automated mode. However, if after attempting to operate in fully automated mode control computer 212 determines it has no (further) strategies available to grasp one or more items, in various embodiments control computer 212 sends an alert to obtain assistance from a human operator via teleoperation, e.g., by human operator 220 using teleoperation device 218.

In various embodiments, control computer 212 controls robotic arm 202 using velocity-based control as disclosed herein and described more fully below.

As illustrated by the examples shown in FIGS. 1A, 1B, and 2, in many applications the world and environment around a robot may be changing constantly. For example, conveyor belts may stop or start unexpected or may operate at an unexpected speed. A human in the environment may be move items or disrupt flow in an unexpected way, or one or more robots or other instrumentalities in the environment may have to stop or slow down to ensure the safety of a human present in the environment. Objects to be moved or otherwise manipulated by a robot may be in a cluttered pile or flow of objects, and objects may shift in their location and/or orientation due to picking and placing of other objects, actions of an automated feeding system, etc.

In various embodiments, a robotic system as disclosed herein continually processes in real time information captured using a variety of sensors, such as encoders, cameras, gates/latches, force sensors, and fieldbus signals. The robotic system dynamically and adaptively controls the robot to adhere to changing constraints, new targets, continuous signal servoing, other user input, etc. Every motion is different and generated real time on the fly. In various embodiments, velocity-based control as disclosed herein is used to respond quickly to changing conditions and requirements, without increased risk of damage to the robot, items being handled by the robot, and other robots or structures in the environment in which the robot is deployed.

In various embodiments, a robotic control system as disclosed herein adapts quickly to changing conditions at least in part by constantly simulating the robot and generating in real time the exact motion the system wants the real robot to follow (e.g., position, velocity, acceleration of the robot joints).

Figure 3:
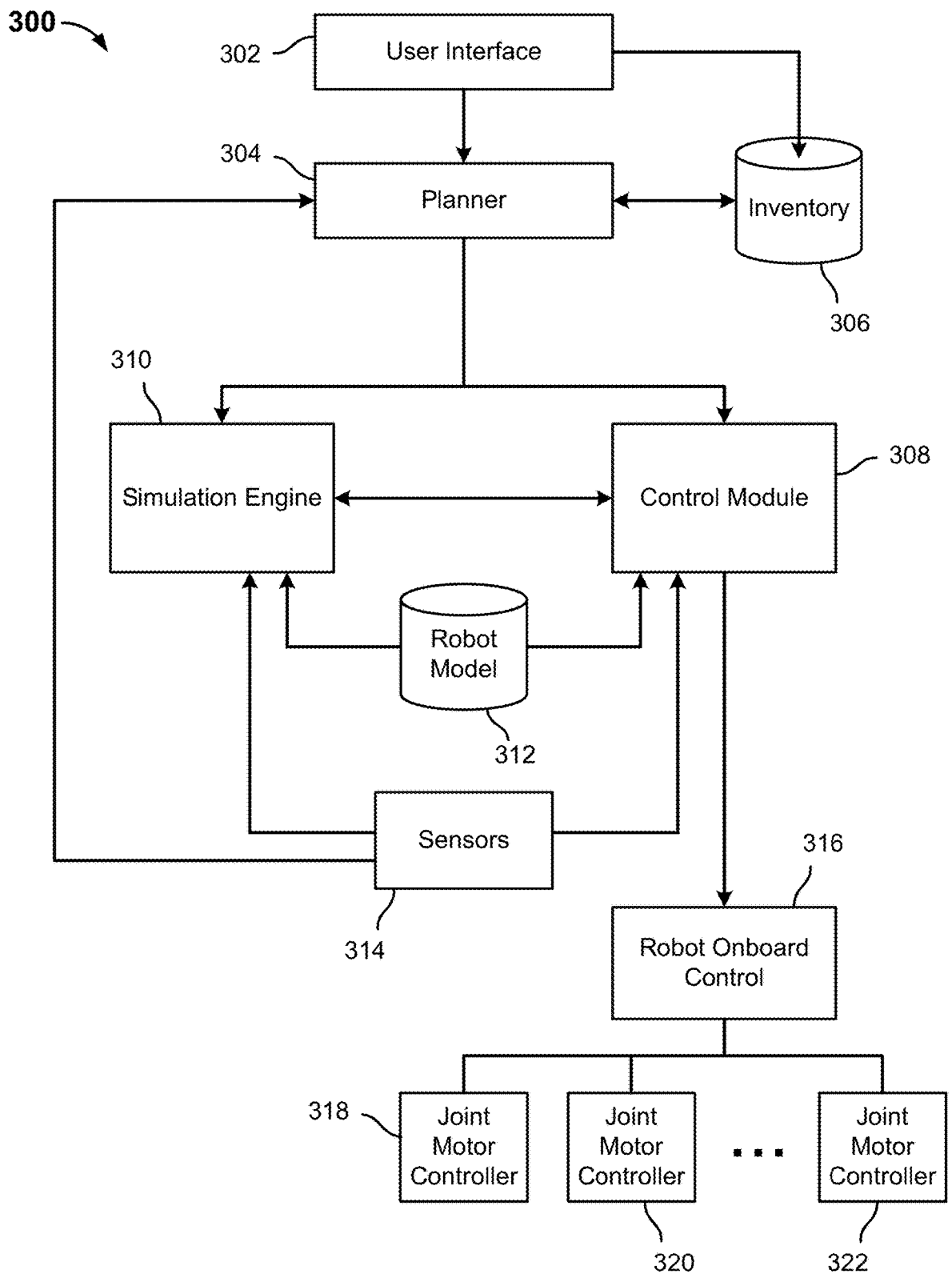
FIG. 3 is a block diagram illustrating an embodiment of a velocity control-based robotic system.

FIG. 3 is a block diagram illustrating an embodiment of a velocity control-based robotic system. In various embodiments, the robotic control system 300 of FIG. 3 is implement at least in part by a control computer, such as computer 122 of FIG. 1A, computer 148 of FIG. 1B, and/or computer 212 of FIG. 2. In the example shown, user input is received via a user interface 302, e.g., a user interface module or code running on a processor comprising a computer (e.g., computer 122, 148, 212) configured to present and receive user input via a graphical, text-based, configuration file-based, or other interface. In various embodiments, user interface 302 is configured to receive an indication of one or more high level objectives to be performed, such as a set of shipping invoices, manifests, or other lists of items and quantities to be assembled into respective containers or kits, as in the example shown in FIG. 1A; indication to stack on a pallet or other receptacle a specific set of items and/or items as received via a conveyance or other source or structure, as in FIG. 1B; and/or indication to place items from an indicated source on a segmented conveyor or other destination, as in FIG. 2. In various embodiments, inventory and/or other information indicating the type, quantity, location, and/or other attributes of inventory or other sources of items to be manipulated by the system may be received via user interface 302.

In the example shown in FIG. 3, high level objectives and other input information received via user interface 302 are provided to planner 304. In various embodiments, planner 304 comprise one or more software components configured to generate, based at least in part on the high level objective(s) received via the user interface 302 and inventory and/or other configuration and initialization information stored in inventory database (or file or other data store) 306, a high level plan to accomplish the high level objective.

The planner 304 provides the high level plan to a control module 308 and simulation engine 310, in this example. In various embodiments, the planner 304 and/or control module 308 include(s) one or more schedulers to schedule specific robotic instrumentalities (e.g., a robotic arm) to perform a sequence of specific tasks (e.g., grasp items A, B, and C and move them to destination receptacle R; or grasp items from chute A and place them singly each in a segmented portion of segmented conveyor C; etc.) and/or subtasks (e.g., grasp item A) to enable the system to make progress, via fully automated operations, toward achieving the high level objective.

In various embodiments, control module 308 is configured to use velocity-based control as disclosed herein to perform robotic operations. For example, to perform a task to grasp an item A and move it to a destination D, in various embodiments control module 308 determines a trajectory that is at least in part velocity-based, e.g., to move an end effector (suction or pincer/finger type gripper) to a position to grasp the item A and/or move the end effector with the item A in its grasp to the destination D. In various embodiments, the trajectory includes a sequence of one or more velocity vectors (e.g., magnitude/speed and direction in three-dimensional space) along and/or according to which the end effector is to be moved. The trajectory may indicate the desired velocity (magnitude and direction) for each of set of one or more phases or segments and/or may indicate for each segment and/or each transition between segments a desired and/or maximum rate of acceleration and/or other higher order derivatives of position (e.g., jerk, etc.).

In various embodiments, control module 308 uses a model 312 of the robot(s) to be controlled to determine a set of control commands to be sent to the robot to cause the end effector (or other element comprising the robot) to be moved at/in the velocity comprising the trajectory the control module 308 has determined the end effector is to be moved. The control module 308, in various embodiments, uses image or other information generated and provided by sensors 314 to determine and implement the trajectory, and to respond quickly to changes in the environment in which the robot is working, such as unexpected changes in the state or condition of an item that is being or is to be moved by the robot and/or other items in the space; the location, state, and movement of other robots in the space; the location of human workers present in the space; and actual observed movement of the robot and/or elements comprising the robot being controlled by the control module 308.

In various embodiments, control module 308 sends commands to robot onboard control subsystem 316 to implement a determined trajectory. Robot onboard control subsystem 316 in turn sends commands for each specific joint or other motive element of the robot to a corresponding joint (or other) motor controller, such as one or more of motor controllers 318, 320, and 322. The motor controllers, e.g., 318, 320, and 322, respond to commands from robot onboard control subsystem 316 to supply current to an associated controlled motor at a level associated with a desired torque for a prescribed/indicated duration, e.g., for a time indicated in the command or until commanded to stop. In some embodiments, robot onboard control subsystem 316 sends to each motor controller 318, 320, and 322 a set of commands or other control signals to apply a series of torques in sequence, each for a corresponding duration, to cause the joints to rotate in coordination to move the end effector and/or other operative element of the robot through space according to the determined trajectory.

In various embodiments, simulation engine 310 uses one or more of inputs received from planner 304, control signals generated by control module 308, robot model 312, and sensor data from sensors 314 to simulate continuously operation of the robot. For example, torque-related commands from control module 308 and robot model 312 may be used to simulate the resulting movement of the robot. Data from sensors 314 may be used to estimate and reflect in the simulation the attributes of items in the space, such as an item in the grasp of the robot. In various embodiments, control module 308 compares observed velocities, e.g., of the end effector or other elements of the robot, to corresponding expected/simulated velocities generated by simulation engine 310. If the observed velocity deviates from the expected (simulated) velocity, a correction is determined and control module 308 sends associated commands to the robot onboard control subsystem 316 to implement the correction.

In various embodiments, the sensor data generated by sensors 314 is provided to planner 304. In some embodiments, planner 304 is configured to continuously monitor the sensor data 304 to determine whether to update a plan generated by planner 304 based on conditions as observed based on the sensor data. For example, if an item has been dropped or did not arrive in the workspace as/when expected, an updated plan that takes that information into account may be generated.

In various embodiments, a robotic system as disclosed herein performs adaptive/intelligent trajectory generation, which makes use of the ability to control higher derivatives (velocity, and acceleration) and not just position of robot and/or elements comprising the robot. When trying to follow a real time motion plan accurately, the system uses velocity and/or acceleration control to follow the simulated robot very exactly, enabling the system to react more quickly to changing environment. If velocity and acceleration tracking were not used, as disclosed herein the real (not simulated) robot would lag behind the desired path/position (as determined by simulation, e.g.). If the desired position is not changing anymore, the real robot can eventually get to the desired position very accurately, in some embodiments, using (only) position control. But if desired position is changing, the real robot cannot effectively track the path dynamically using only position control; therefore, in various embodiments, velocity and/or acceleration control are used. In various embodiments, velocity and acceleration tracking allow the robot to instantly know when and how to accelerate without waiting for a large position error, allowing these higher derivatives (i.e., velocity, acceleration, etc.) to be tracked accurately.

Figure 4:
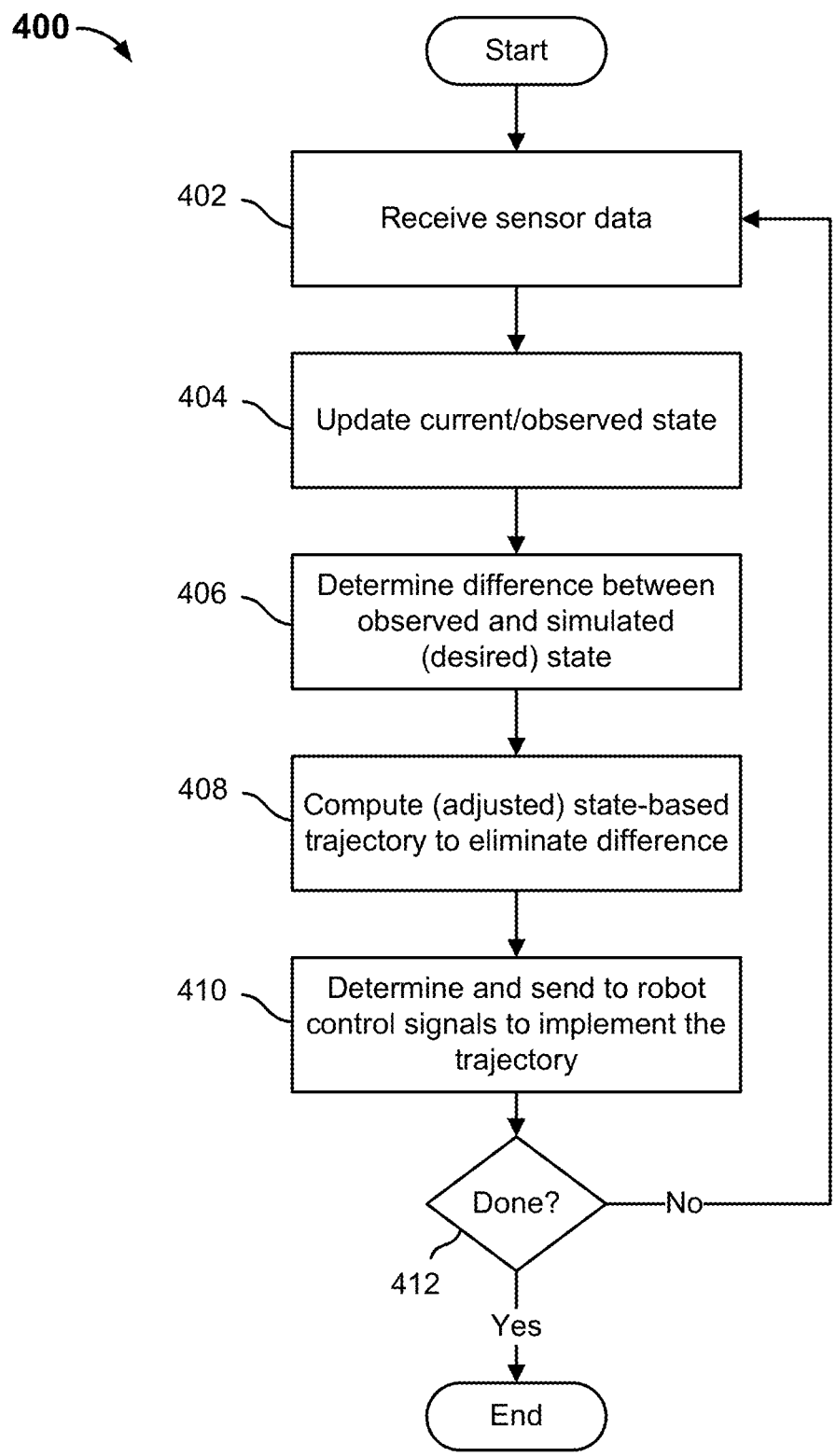
FIG. 4 is a flow diagram illustrating an embodiment of a process to control a robotic system.

FIG. 4 is a flow diagram illustrating an embodiment of a process to control a robotic system. In various embodiments, the process 400 of FIG. 4 is implemented by a control computer, such as computer 122 of FIG. 1A, computer 148 of FIG. 1B, and/or computer 212 of FIG. 2. In the example shown, sensor data is received at 402 and used at 404 to update the current/observed state, e.g., the position, pose, velocity, and acceleration, as applicable of the robot and its relevant component elements, including the end effector; the location, pose, velocity, and acceleration, as applicable, of items in the workspace, such as items to be grasped and moved by the robot; the respective locations, velocity, and acceleration, as applicable, of destination receptacles, such as a container or segment on a conveyor belt; and the position, velocity, and acceleration, as applicable, of structures or potential hazard conditions present in the workspace, such as a human worker.

At 406, a difference between an observed velocity of the end effector (or other element) is compared to the corresponding expected velocity according to a simulation (e.g., by simulation engine 310, in the example shown in FIG. 3). In various embodiments, observed position, acceleration, jerk, etc. may be compared to the corresponding expected values as determined by simulation. In various embodiments, the observed velocity, etc. are determined based on image and/or other sensor data received at 402.

At 408, a trajectory and/or trajectory adjustment determined based at least in part on the difference determined at 406 is computed. At 410, a set of one or more commands are determined and provided to the robot to eliminate a difference between an observed velocity and the expected velocity as indicated by the simulation are generated and sent to the robot. Processing continues until done (412), e.g., all tasks have been completed.

In various embodiments, velocity control as implemented and used in various embodiments provides one or more of the following:
  Fast and adaptive change of motion using velocity control:
    Robot may decide to alter direction of motion at any second due to shifting objects, etc.
    For example, sliding packages on chute or moving along a conveyor; using velocity control, robot quickly adapts to divert to a new package to pick or to intercept and pick a moving package
  With position control, quickly changing the target from in front of the robot to behind the robot causes jerks, objects dropping, bad for robot hardware, possible errors thrown
  Higher derivative control is used, in various embodiments, to smoothly slow down the robot and switch directions, but as fast as possible given limits on object/robot to reduce cycle time
  Control system as disclosed herein knows exactly how to slow down and change direction and speed up, but it would not be possible to command the robot to do this without using velocity/acceleration control as disclosed herein Time optimal algorithms are implemented in various embodiments, using velocity control as disclosed herein, to achieve one or more of the following:
  Controlled deceleration and acceleration, as realized using velocity control as disclosed here, are used in various embodiments to determine and implement a time optimal approach to completing a set of high-level tasks to best achieve an overall objective.
  When holding an object, for example, in various embodiments a system as disclosed herein calculates in real-time the maximum accelerations/decelerations that can be exerted on the object to prevent damage, losing grip, etc.
  These limits may be changing direction and magnitude due to continuous readings from vacuum pressure sensors, weight of object, orientation held, vision, etc.
In various embodiments, the robot and/or control system uses velocity control to accurately limit the motion and forces exerted on the object
  With only position control, there is no guarantee or ability to "control" these accelerations
  Therefore, when using only position control, a control system would need to be extra conservative to be strictly under these limits, hurting cycle time and speed of the robot Machine learning guided visual servoing (e.g., image sensor and vision system based automated robotic control) is implemented, in various embodiments, using velocity control as disclosed herein to perform one or more of the following:
  Much like a human, robots adjust their position, grip, force by looking at the environment and sensing the offset from current state and the desired state (tightness for packing an object, hand should be directly over an object for a grasp, etc.)
  Rather than directly telling the robot what to do once from one vision snapshot, in various embodiments, a system as disclosed herein is continuously adjusting its control commands to the robot to make sure the action is successful
  Usually these adjustments are based on "deltas": e.g., adjustments made to close the gap between desired visual state (e.g., simulation indicated velocity) and current visual state (e.g., observed velocity)
  Velocity control is used, in various embodiments, to close these deltas; position control alone is not sufficient, because the system does not know how far to go on the 0th derivative (position), just that it needs to move in a particular direction (1st derivative) until the error is 0

State based trajectories are implemented, in various embodiments, using velocity control as disclosed herein, e.g., as follows:
  In various embodiments, a robotic system as disclosed herein uses velocity control to overcome challenges associated with using a robot to perform tasks in a highly dynamic environment, such as applications that may require belt tracking, moving object pick and place, and reaction from disturbances due to human interaction, collision avoidance, etc.
  In various embodiments, a system as disclosed herein may use velocity control to implement state based (or other time-variant) trajectories State based trajectories are motions guided by states of the environment and the robot (robot current positions, conveyor belt positions and speeds, etc.) and not by time.

In various embodiments, a robotic system as disclosed herein continually works to achieve a particular state as a function of current state However, achieving this state typically isn't as simple as setting a desired position to be that state, robot usually cannot move that fast and is subject to constraints highlighted above, such as grip quality A robotic control system as disclosed herein generates a motion (e.g., of the robot) that attains a desired state, such as by using velocity control to direct movement of the robot along a very particular trajectory of position, velocity, and acceleration, as that is what embodies more fully the definition of "motion", not just change of position In various embodiments, a trajectory as described above (e.g., in terms of velocity and/or acceleration, for example, and not just position) is followed using velocity (and/or other higher derivative) control, to achieve a desired state and motion, such as a motion/trajectory determined by simulation For example, tracking a belt—belt is moving at a velocity, and belt slot is at a (continuously changing) position Robot needs to track and follow a moving belt slot, maintain gripper directly above slot, and pick or place object, for example Velocity control enables a robotic system as disclosed herein to accurately track both position and velocity of the belt without any lagging behind in position Intelligent force control is implemented, in various embodiments, using velocity control as disclosed herein, e.g., as follows:

Controlling force on the robots through position control (alone) requires using position error as a proxy for force Controlling force through higher derivatives—position/acceleration, as disclosed herein, allows for a tighter loop on force, increasing force control bandwidth and latency Since force is a directly related to motor current—position is a bad way to modulate current—typically a robotic control system does not know, a priori, how much of a position error is needed to exert a particular force The higher derivative control the system has, the better ability for determining how much force a joint will apply 1) With velocity control, it's easier for the real robot to follow the simulated robot and the forces the simulated robot wants to apply 2) Velocity is position invariant, so, while any errors in position control affect force control as implemented using only position control, the use of velocity control, as disclosed herein, enables the control system to more directly affect the force applied from the robot without regard to positional accuracy Using position control to indirectly control force, an error in the position of the robot (e.g., end effector) relative to the item and/or environment (e.g., table, floor, or other surface the item is resting on) can result in a force being applied along a vector other than the desired vector, whereas velocity control enables the vector of desired movement, and therefore the direction in which force is applied, to be specified/controlled directly, without regard to position.

Figure 5A:
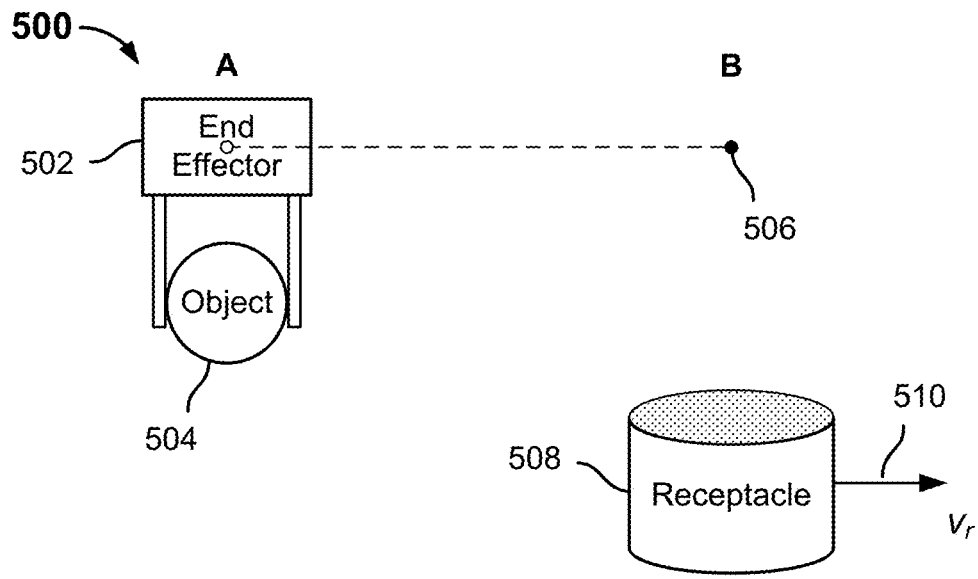
FIG. 5A is a diagram illustrating an example of velocity control in an embodiment of a velocity control-based robotic system.

Force control implemented through velocity control unlocks the ability for robots to adapt more quickly to manipulating the environment and/or objects present in the environment When something pushes back, or when contacting a surface, velocity control reacts much faster than position control Palletizing boxes, for example, as shown in FIG. 1B:

E.g., assembly dissimilar boxes or other items in layers on a pallet, such as for shipping Using velocity control, a system as disclosed herein can quickly react to a box being placed without crushing it, allowing the system to move faster and react more immediately FIG. 5A is a diagram illustrating an example of velocity control in an embodiment of a velocity control-based robotic system. In the example environment and system 500, an end effector 502, e.g., mounted at the distal/operative end of a robotic arm (not shown in FIG. 5A) with an object 504 in its grasp is tasked to place the object 504 in a receptacle 508. If the receptacle 508 were stationary, the system could use position control to move the end effector 502 and object 504 to a static position, e.g., point 506 in the example shown, above the receptacle 508 and release the object 504 to place it in the receptacle 508. However, as shown, in this example the receptacle 508 is moving to the right (as shown) at a velocity represented by vector 510. While position control could be used to move the effector 502 and object 504 to a predicted target position above a predicted future location of receptacle 508, that approach could result in errors or damage, e.g., if the predicted position were off by enough of an amount to result in the object 504 not being placed successfully into the receptacle 508.

In various embodiments, a robotic system as disclosed herein uses velocity control to more quickly and accurately place the object 504 into the moving receptacle 508. For example, in some embodiments, a robotic control system as disclosed herein would observe and determine the velocity 510 of the receptacle 508 and would compute and implement via velocity control, as disclosed herein, a trajectory to intercept and then move in parallel with receptacle 508, to enable the object 504 to be placed successfully into the receptacle 508, as both continued to move at velocity 510.

Figure 5B:
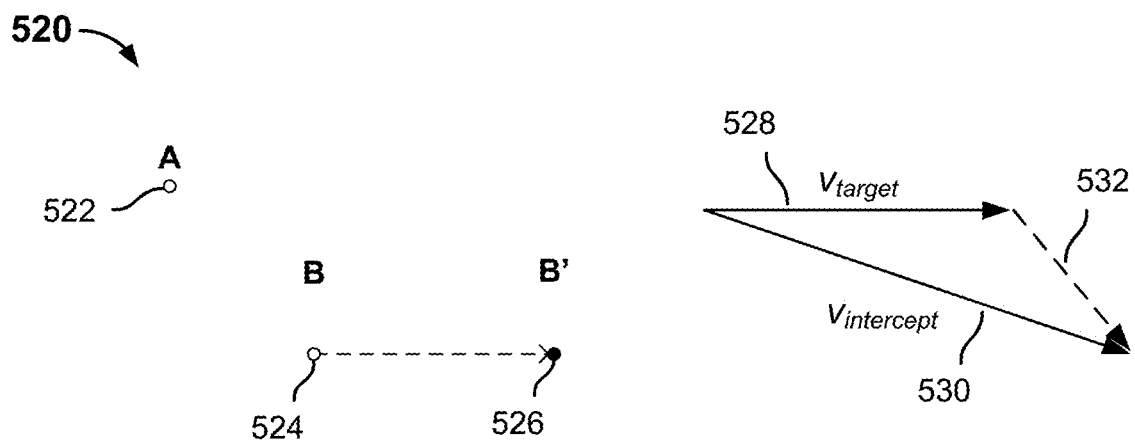
FIG. 5B is a diagram illustrating an example of velocity control in an embodiment of a velocity control-based robotic system.

FIG. 5B is a diagram illustrating an example of velocity control in an embodiment of a velocity control-based robotic system. In the example 520 shown in FIG. 5B, an end effector (not shown) at point A 522 is desired to be moved to a point B 524 relative to a target (not shown), such as a receptacle into which an object is to be placed or from which an object as it be retrieved. As shown, the target will have moved to a new location point B' 526 by the time the end effector represented by point A 522 can be moved into position, due to the object/receptacle associated with points B 524 and B' 526 moving to the right (as shown) at a velocity represented by vector 528. As shown by the vector diagram on the right side of FIG. 5B, in various embodiments velocity control as disclosed herein is used to determine a velocity vector 530 to intercept the target at location B' 526, resulting in relative motion represented by vector 532. In various embodiments, the trajectory or a subsequent trajectory may then include a velocity that match the target velocity 528, enable the end effector to be moved in parallel with the target until the object can be released or grasped, as applicable.

Figure 5C:
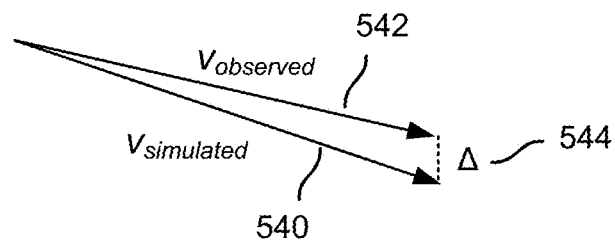
FIG. 5C is a diagram illustrating an example of velocity control in an embodiment of a velocity control-based robotic system.

FIG. 5C is a diagram illustrating an example of velocity control in an embodiment of a velocity control-based robotic system. In the example shown, an observed velocity 542 (e.g., computed based on sensor data) is compared to a corresponding simulated velocity 540 to determine a difference 544. In various embodiments, the velocity control system as disclosed herein determines and provides a velocity control signal calculated to the eliminate (reduce to zero) the difference 544 between the simulated velocity 540 and observed velocity 542.

Figure 6:
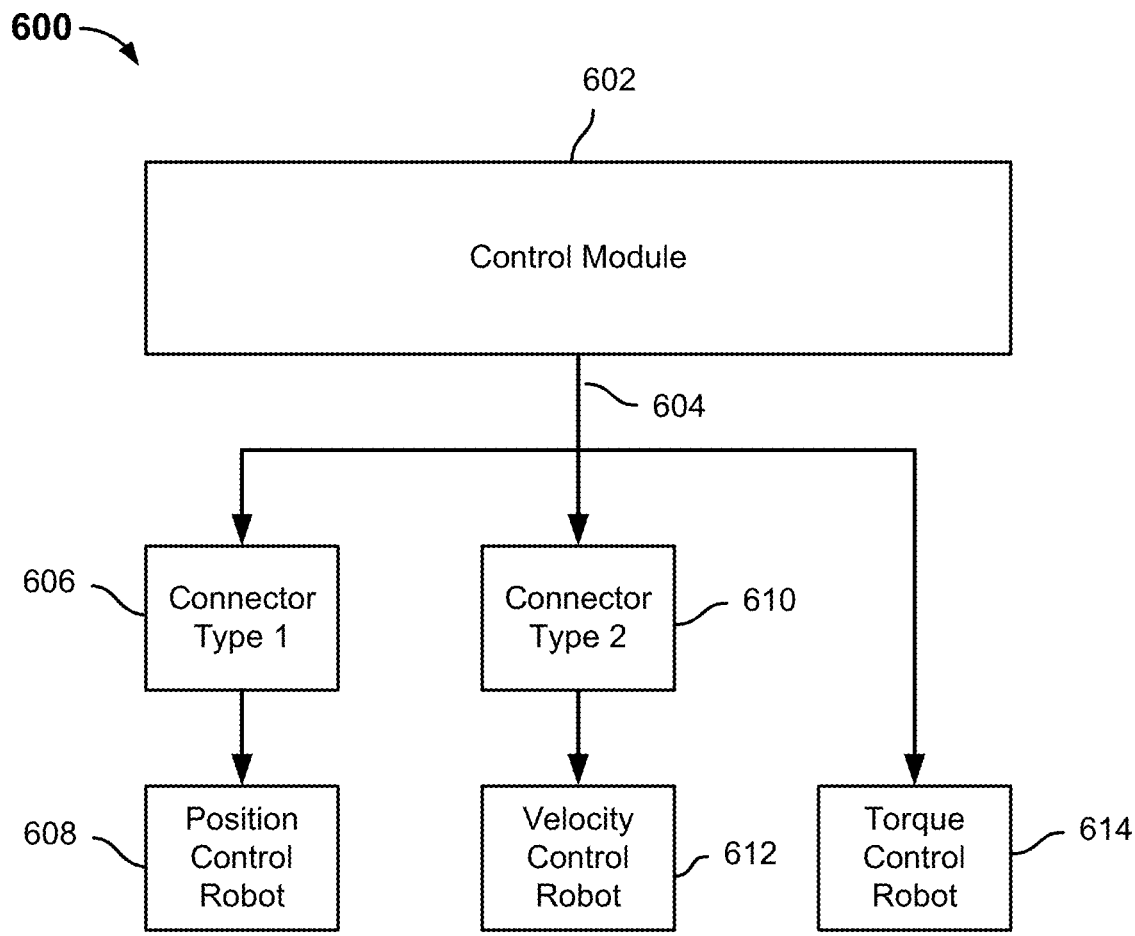
FIG. 6 is a block diagram illustrating an embodiment of a velocity control-based robotic system.

FIG. 6 is a block diagram illustrating an embodiment of a velocity control-based robotic system. In the example shown, control system 600 includes a control module 602 configured to implement velocity-based control as disclosed herein at least in part by determining a trajectory that includes a velocity-based component and providing via interface 604 control signals associated with torques computed to implement the determined trajectory. The torque-based control signals 604 in this example may be translated by a first type of connector 606 to generate position control signals to control a traditional position-controlled robot 608 to implement, to the extent and/or in the manner possible, the determined trajectory. Similarly, the torque-based control signals 604 may be translated by a second type of connector 610 to generate velocity control signals to control a velocity-controlled robot 612 to implement the determined trajectory more directly. Finally, in this example, torque-based control signals 604 may be provided to and implemented directly by a torque control robot 614.

In some embodiments in which a torque control robot, such as torque control robot 614, is controlled, the system does not need to perform simulation, as described above, to determine a simulated or expected velocity, e.g., of the end effector, since the torque control commands of the robot are mapped directly to torque commands to the torque control robot 614 and the resulting velocities are more reliably determined based on the robot model alone, e.g., model 312 of FIG. 3.

In various embodiments, the robot control type (e.g., position, velocity, torque) agnostic architecture, such as the system 600 of FIG. 6, enables a single control module 602 to be used, with or without a connector, as needed, to control different types of robot, e.g., 608, 612, and 614.

FIG. 7A is a flow diagram illustrating an embodiment of a process to determine and impose limits to control a robotic system. In various embodiments, the process 700 of FIG. 7A is implemented by a control computer, such as computer 122 of FIG. 1A, computer 148 of FIG. 1B, and/or computer 212 of FIG. 2. In the example shown, sensor data received at 702 is used to determine at 704 applicable limits on the velocity, acceleration, jerk, etc., to avoid damage. For example, image, weight, or other sensor data received at 702 may be used to determine how heavy, fragile, or rigid an object that is in the grasp of the robot or to be grasped, or other attributes that may affect how securely the robot has or will be able to have the object in its grasp. The grasp may be monitored actively, such as by monitoring pressures or air flow associated with a suction gripper or monitoring or estimating shear forces to detect actual or potential/imminent slippage of an item from the robot's grasp. Sensor data may be used to classify the object, e.g., by type or class (based on volume, weight, etc.), and application limits (e.g., on velocity or other higher order derivatives of position) may be determined based on the classification. At 706, the limits determined at 704 are implemented and enforced. For example, a trajectory determined to perform velocity-based control, as disclosed herein, may be determined by the control system taking into consideration the limits determined at 704. For example, a trajectory may be determined that ensures that at all times the end effector remains below a velocity limit determined at 704. Processing continues as described (702, 704, 706) until done (708), e.g., until objects are no longer being moved by the system.

FIG. 7B is a flow diagram illustrating an embodiment of a process to use an imputed force field to control a robotic system. In various embodiments, the process 720 of FIG. 7B is implemented by a control computer, such as computer 122 of FIG. 1A, computer 148 of FIG. 1B, and/or computer 212 of FIG. 2. In various embodiments, the process 720 may be used to avoid or minimize the risk of a robotic element, such as an end effector, colliding with a structure comprising or associated with the robot, such as the carriage 118 or rail 120 in the example shown in FIG. 1A, or another structure or hazard, such as the human worker 128 or box assembly machine 110 in the example shown in FIG. 1A.

In the example shown, at 722 the system detects that a controlled robotic element, such as an end effector, is in proximity to a structure, object, instrumentality, and/or person with which contact/collision is to be avoided. At 724, an imputed force of repulsion is calculated. In various embodiments, the calculated imputed force of repulsion increases the closer the controlled element is/gets to the object, etc. with which contact is to be avoided. At 726, the velocity and/or trajectory is determined in a manner that takes into account the imputed repulsive force determined at 724. In various embodiments, a velocity-based robotic control system as disclosed herein determines and implements trajectories that take the imputed force of repulsion, as described above, into consideration. For example, a trajectory may be determined that ensures based on simulation that the imputed force of repulsion will not exceed a prescribed threshold.

Figure 8A:
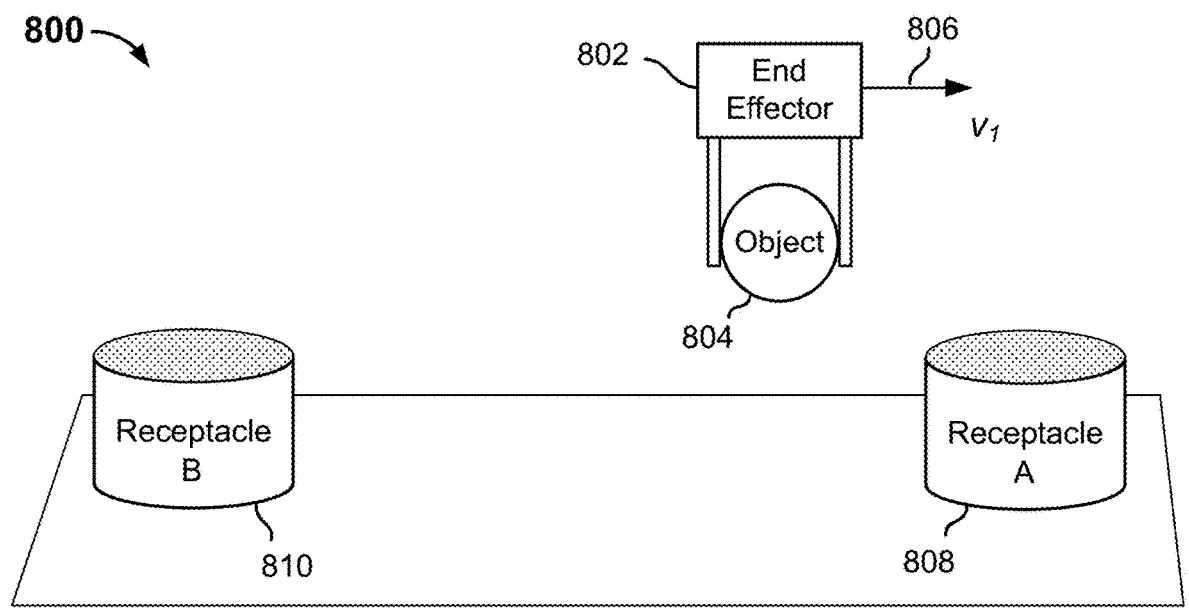
FIG. 8A is a diagram illustrating an example of velocity control in an embodiment of a velocity control-based robotic system.

FIG. 8A is a diagram illustrating an example of velocity control in an embodiment of a velocity control-based robotic system. In the system and environment 800 as shown, an end effector 802 holding an object 804 is moving at a first velocity 806 to the right (as shown), towards a first receptacle 808 in this example. Upon occurrence of an observed or commanded change, for example, the system may determine to instead place the object 804 in a second receptacle 810, in the opposite direction of travel as compared to velocity 806.

Figure 8B:
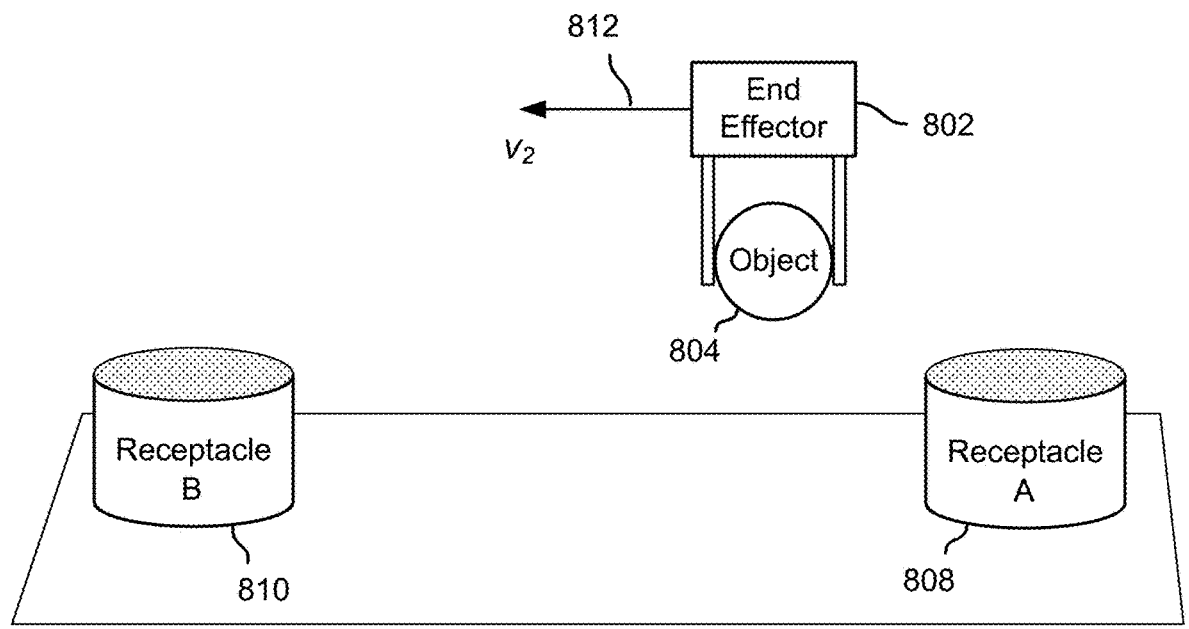
FIG. 8B is a diagram illustrating an example of velocity control in an embodiment of a velocity control-based robotic system.

FIG. 8B is a diagram illustrating an example of velocity control in an embodiment of a velocity control-based robotic system. In the state shown, to move the object 804 to the second receptacle 810, instead of the first receptacle 808, the end effector has been changed to moving in the direction associated with vector 812.

FIGS. 8A and 8B provide an example that illustrates a difference between dynamically responding to a condition (e.g., change in destination location) using position control and velocity control, as implemented in various embodiments. In a typical position control based robotic system, a change of destination resulting in a desired to move to a destination in an opposite or otherwise substantially different direction typically would result in the end effector rapidly (almost instantaneously) decelerating and then rapidly accelerating in the opposite direction. Moreover, the position-controlled robot may accelerate more aggressively and/or to a higher speed the further the end effector is from the new target/destination. The rapid and nearly instantaneous change of direction could damage the object in the robot's grasp and/or result in the robot losing its grasp of the object. By contrast, velocity control as implemented in various embodiments is used to implement a trajectory that includes a more controlled transition to travel in the new direction, e.g., the direction and speed represented by vector 812 in the example shown.

Figure 8C:
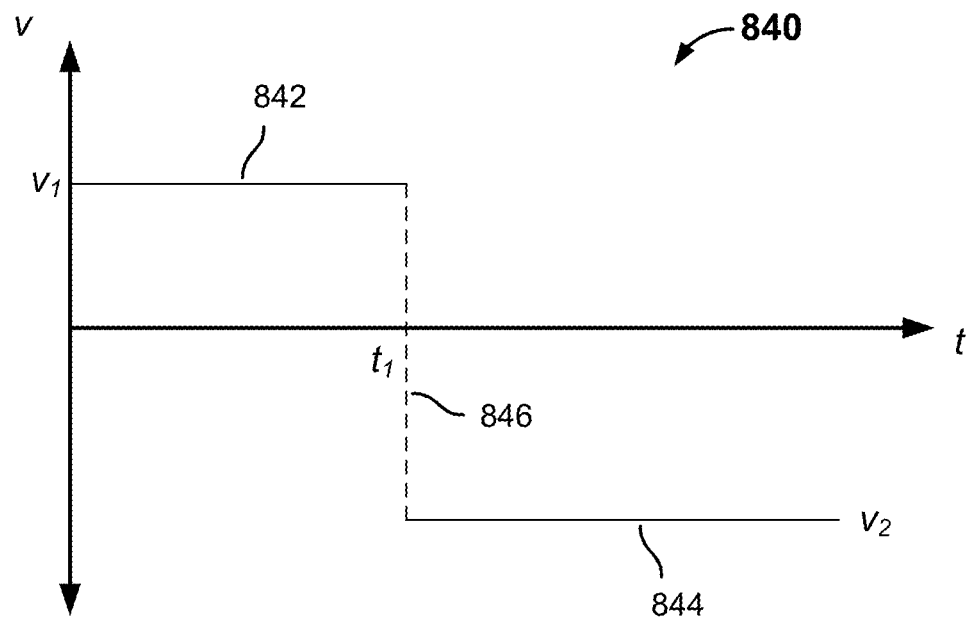
FIG. 8C is a diagram illustrating for comparison purposes an example of using position control to change target and/or destination in controlling a robotic system.

FIG. 8C is a diagram illustrating for comparison purposes an example of using position control to change target and/or destination in controlling a robotic system. In the example shown, graph 840 shows velocity over time for a position-controlled robot that changes target/destination as in the example shown in FIGS. 8A and 8B. As illustrated, the end effector moves at velocity v1, e.g., vector 806 as shown in FIG. 8A, and changes almost instantaneously at time t1 (represented by dashed line 846) to a velocity v2 844, with opposite direction and greater magnitude than velocity v1.

Figure 8D:
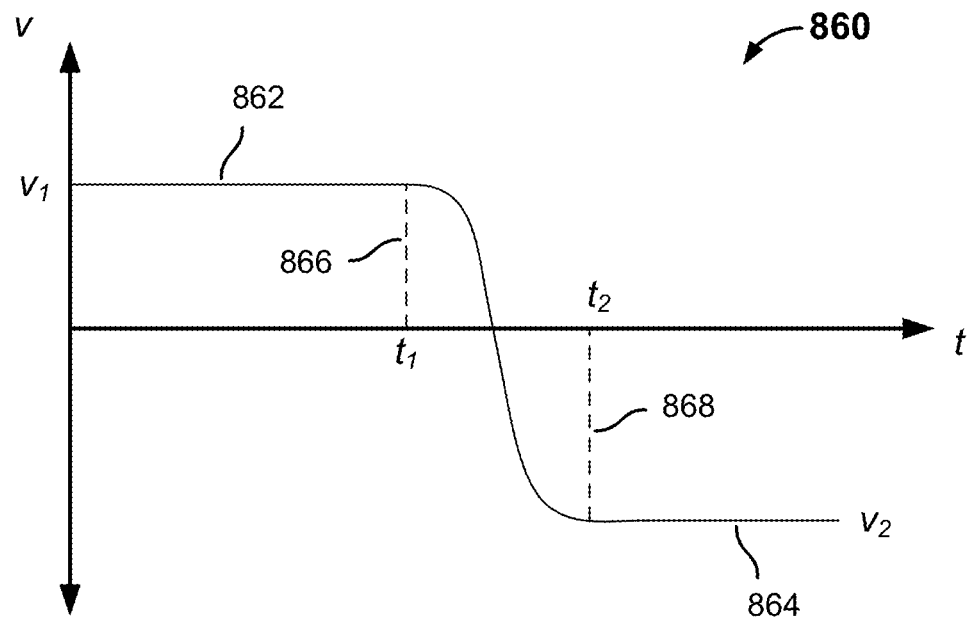
FIG. 8D is a diagram illustrating an example of using velocity control, as disclosed herein, to change target and/or destination in a robotic system.

FIG. 8D is a diagram illustrating an example of using velocity control, as disclosed herein, to change target and/or destination in a robotic system. In the example shown, graph 860 shows velocity over time for a velocity-controlled robot, as disclosed herein, that changes target/destination as in the example shown in FIGS. 8A and 8B. As in the example shown in FIG. 8C, the end effector at first moves at velocity v1 862 before receiving an indication at time t1 866 to change to a new target/destination. Velocity control as disclosed herein enables a trajectory to be determined and implemented via velocity control to transition between time t1 866 and time t2 868 to the new velocity v2 864. The time between t1 and t2 are exaggerated in FIG. 8D to illustrate the point that velocity control enables the change of direction to be implemented without abrupt movements or potentially excessive acceleration or speed, since commands more directly associated with end effector velocity are provided.

FIG. 9A is a flow diagram illustrating an embodiment of a process to use velocity control to divert to a new target and/or destination. In various embodiments, the process 900 of FIG. 9 is implemented by a control computer, such as computer 122 of FIG. 1A, computer 148 of FIG. 1B, and/or computer 212 of FIG. 2. In the example shown, at 902 an indication is received the change the target/destination. At 904, a trajectory to reach the new target/destination is computed that includes a velocity, acceleration, etc. aware transition to a vector (velocity) to reach/intercept the new target/destination. For example, the trajectory may include a first phase to gradually decelerate and then accelerate in a controlled manner in a direction towards the new target/destination. At 906, the determined trajectory is implemented.

FIG. 9B is a flow diagram illustrating an embodiment of a process to use velocity control to use two or more robots cooperatively to perform a task. In various embodiments, the process 920 of FIG. 9B is implemented by a control computer, such as computer 122 of FIG. 1A, computer 148 of FIG. 1B, and/or computer 212 of FIG. 2. In the example shown, at 922 the system determines to grasp an object with two or more robots. For example, a tray, pallet, or other receptacle containing items may be determined to be grasped and moved using two robots, e.g., each pushing on opposite sides/ends and then lifting and moving the receptacle in synchronization to place the receptacle at a destination location.

At 924, a strategy to grasp the object using the robots, e.g., each applying a computed or otherwise determined normal force to a side or structure the robot is assigned to engage is determined and implemented. At 926, velocity control is used to move the robots in synchronization, each at the same velocity at all times, to maintain engagement of all the robots with the item (e.g., receptacle) as they move it together to the destination.

In various embodiments, velocity control facilitates coordinated/synchronized movement of an item using multiple robots, in part because velocity is position independent. For example, two robots can be controlled to press in directly opposite directions even if the position of the object or one or both of the robots is not precisely known. In a position controlled system, even a small error in position could result in force being applied in an incorrect direction.

Multi-robot collaboration is implemented using velocity control, in various embodiments, as follows:
  With improved force control achieved via velocity control, as disclosed herein, robots can collaborate more effectively with higher bandwidth
  Enables ability for dual robot to react to environment/hardware abnormalities quickly
    For example, when one or more robots slow down suddenly due to poor hardware or obstacles in the way, one or more other robots react instantly due to velocity control, immediately slowing down, complying with a counter force, or otherwise adapting without waiting for position error to grow
    Objects gripped by multiple robots, e.g., by each applying a force from opposite sides, don't get crushed and are subject to less shock on the object, preserving product quality FIG. 10 is a block diagram illustrating an embodiment of a velocity control-based robotic system. In the example shown, control module or subsystem 1000 includes a control stack 1002 configured to generate velocity-based control signals/commands 1004, as described above. An expected/simulated velocity Vsim generated by simulation 1006 is compared to an observed/actual velocity Vobserved determined based on data from sensors 1008 to generate velocity error/difference 1010 (e.g., difference 544 of FIG. 5C). In a first phase and/or based on a first clock or sampling frequency, the control stack uses the velocity errors/differences 1010 and velocity control layers of control stack 1002 to determine and provide control signals 1004 to try to minimize or eliminate the errors/differences 1010. In a second phase, e.g., as a target or destination becomes near, and/or based on a second clock or sampling frequency that is less frequent than the first, the control stack 1002 uses position information 1012 received from and/or determined based on image or other data received from sensors 1008 to compare, e.g., in a position control layer above the velocity control layer in the control stack 1002, to adjust and/or determine a final trajectory to reach the target or destination, including by generating and providing further control signals 1004 to implement the adjusted and/or final trajectory.

Techniques disclosed herein may be used, in various embodiments, to control one or more robots in a more precise, efficient, and flexible/adaptive manner, enabling robots to be used more safely and efficiently, even in highly dynamic environments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A robotic system, comprising:
a communication interface; and
a processor coupled to the communication interface and configured to:

receive via the communication interface sensor data from one or more sensors deployed in a physical space in which a robot is located;

determine based at least in part on the sensor data an at least partly velocity-based trajectory along which to move an element comprising the robot including by determining a vector to intercept a moving item located at a first location and a first distance away from the element, wherein the moving item is grasped by the element at a second location that is based on the a velocity associated with the moving item and the first distance, wherein the determined intercept vector matches the velocity associated with the moving item;

send to the robot, via the communication interface, a command to implement the at least partly velocity-based trajectory;

compare an observed velocity of the element to a corresponding simulated velocity of the element according to a simulated operation of the robot;

determine a difference between the observed velocity of the element and the corresponding simulated velocity of the element; and send to the robot, via the communication interface, a second command that causes the robot to reduce the difference between the observed velocity of the element and the corresponding simulated velocity of the element.

2. The system of claim 1, wherein the sensor data includes image sensor data.

3. The system of claim 1, wherein the communication interface comprises a wireless interface.

4. The system of claim 1, wherein the processor is further configured to simulate operation of the robot in a location.

5. The system of claim 1, wherein the element comprising the robot comprises an end effector.

6. The system of claim 1, wherein the processor is further configured to determine based at least in part on an attribute of an object currently within a grasp of the element comprising the robot a set of limits including one or more of a velocity limit and an acceleration limit, and to enforce the set of limits in determining the at least partly velocity-based trajectory.

7. The system of claim 1, the command includes a torque-based command associated with a computed torque to be applied at a joint associated with the command to achieve the at least partly velocity-based trajectory.

8. The system of claim 1, wherein the processor is further configured to determine the at least partly velocity-based trajectory based at least in part on an imputed repulsion force associated with an item or structure in a location.

9. The system of claim 8, wherein the item or structure includes one or more of a chassis or other structure comprising the robot, a rail or other structure on which one or more of the robot and the chassis are configured to ride, a second robot present in the location, and a fixed structure present in the location.

10. The system of claim 1, wherein the processor is configured to receive an indication to divert from a first task associated with a first velocity-based trajectory to a second task, and to determine and implement a second velocity-based trajectory to perform the second task.

11. The system of claim 10, wherein the processor is configured to include in the second velocity-based trajectory a velocity-based transition from moving the element in a first direction comprising the first velocity-based trajectory to a trajectory to a second direction associated with the second task.

12. The system of claim 1, wherein the robot comprises a first robot and the processor is configured to grasp an object using the first robot and a second robot, and to use velocity control to move the first robot and the second robot in synchronization to move the object to a destination position.

13. The system of claim 1, wherein the processor is configured to determine and use a position error or difference between an expected position of the element and an observed position determined based at least in part on the sensor data to determine and implement an adjustment to the at least partly velocity-based trajectory.

14. A method to control a robotic system, comprising:
receiving sensor data from one or more sensors deployed in a physical space in which a robot is located;

using a processor to determine based at least in part on the sensor data an at least partly velocity-based trajectory along which to move an element comprising the robot including by determining a vector to intercept a moving item located at a first location and a first distance away from the element, wherein the moving item is grasped by the element at a second location that is based on a velocity associated with the moving item and the first distance, wherein the determined intercept vector matches the velocity associated with the moving item;

sending to the robot, via a communication interface, a command to implement the at least partly velocity-based trajectory;

comparing an observed velocity of the element comprising the robot to a corresponding simulated velocity of the element according to a simulated operation of the robot;

determining a difference between the observed velocity of the element and the corresponding simulated velocity of the element; and sending to the robot, via the communication interface, a second command that causes the robot to reduce the difference between the observed velocity of the element and the corresponding simulated velocity of the element.

15. The method of claim 14, further comprising using the processor to simulate operation of the robot in a location.

16. The method of claim 15, wherein the at least partly velocity-based trajectory is determined at least in part by comparing an observed velocity of the element comprising the robot to a corresponding simulated velocity of the element according to the simulated operation of the robot.

17. The method of claim 16, further comprising determining based at least in part on an attribute of an object currently within a grasp of the element comprising the robot a set of limits including one or more of a velocity limit and an acceleration limit, and using the processor to enforce the set of limits in determining the at least partly velocity-based trajectory.

18. A computer program product embodied in a non-transitory computer readable medium and comprising computer instructions for:
receiving sensor data from one or more sensors deployed in a physical space in which a robot is located;

determining based at least in part on the sensor data an at least partly velocity-based trajectory along which to move an element comprising the robot including by determining a vector to intercept a moving item located at a first location and a first distance away from the element, wherein the moving item is grasped by the element at a second location that is based on the a velocity associated with the moving item and the first distance, wherein the determined intercept vector matches the velocity associated with the moving item;

sending to the robot, via a communication interface, a command to implement the at least partly velocity-based trajectory;

comparing an observed velocity of the element to a corresponding simulated velocity of the element according to a simulated operation of the robot;

determining a difference between the observed velocity of the element and the corresponding simulated velocity of the element; and sending to the robot, via the communication interface, a second command that causes the robot to reduce the difference between the observed velocity of the element and the corresponding simulated velocity of the element.

19. The computer program product of claim 18, further comprising computer instructions to simulate operation of the robot in a location.

* * * * *